United States Patent [19]

Scott

[11] Patent Number: 4,762,597
[45] Date of Patent: Aug. 9, 1988

[54] ELECTROCHEMICAL OXIDATION OF AN ORE TO RELEASE METAL VALUES OF INTEREST

[76] Inventor: David M. Scott, #316-980 Wordsley Street, Victoria, B.C., Canada, V9A 6Y4

[21] Appl. No.: 81,691

[22] Filed: Aug. 5, 1987

[51] Int. Cl.$^4$ .............................................. C25C 1/00
[52] U.S. Cl. .......................... 204/105 R; 204/98; 204/128; 204/111; 204/113; 204/273
[58] Field of Search ................ 204/105 R, 111, 113, 204/128, 98, 273, 261

[56] References Cited

U.S. PATENT DOCUMENTS

| | | | |
|---|---|---|---|
| 332,705 | 12/1885 | Eames | 204/273 |
| 391,360 | 10/1888 | Eames | 204/273 |
| 899,128 | 5/1908 | Hendryx | 204/273 |
| 1,243,977 | 10/1917 | Reyes | 204/273 |
| 3,583,897 | 6/1971 | Fulweiler | 204/212 |
| 3,772,003 | 11/1973 | Gordy | 75/101 |
| 3,836,443 | 9/1974 | MacGregor | 204/105 M |
| 3,840,445 | 10/1974 | Cooley et al. | 204/269 |
| 4,564,432 | 1/1986 | Nagai et al. | 204/237 |
| 4,612,093 | 9/1986 | Shor | 204/111 |
| 4,647,307 | 3/1987 | Randsepp et al. | 75/118 R |
| 4,662,613 | 5/1987 | Woog | 266/170 |

Primary Examiner—R. L. Andrews

[57] ABSTRACT

An electrochemical process for oxidizing an ore, such as a refractory ore, utilizes a centrifugal reactor having a central rotor cathode, the circumference of which is enclosed by an anode housing defining an active anode surface. The crushed ore is pulped in an aqueous chloride containing electrolyte and applied to the active anode surface. The reactor is spun in the presence of sufficient electrolyte to establish an electric circuit between the cathode and the anode, and so that a fluid pressure of from about 10 psi to about 100 psi is obtained at the active anode surface. A current density is provided at the active anode surface of from about 0.1 amp/sq.in. to about 1.0 amp/sq.in. so that chlorine is generated at the anode and the crushed ore particles are oxidized to release metal values of interest.

12 Claims, 2 Drawing Sheets

ELECTROCHEMICAL OXIDATION OF AN ORE TO RELEASE METAL VALUES OF INTEREST

This invention is a method for oxidizing ore for the purpose of releasing metal values of interest so that they can be recovered. For example, the efficient recovery of gold from a sulfidic refractory ore requires the oxidation of the sulfide components of the ore so that the entrapped gold may be rendered available for recovery by, for example, cyanide leaching.

Many oxidation methods have been used in relation to the recovery of metal values from ores from simply smelting ores, to subjecting them to a wide variety of oxidizing agents under a wide variety of conditions. The present invention is an electrochemical process for oxidizing an ore which has particularly beneficial application to the oxidation of refractory gold containing ores. However, it should be understood that the invention has general application as a method for oxidizing ores to release metal values of interest and is not restricted in its application to gold bearing refractory ores.

The process according to the invention comprises oxidizing ore particles at the anode of a centrifugal electrolytic reactor by means of chlorine which is generated at the anode electrolytically. A typical centrifugal reactor suitable for use in the process of the invention comprises a central rotor and a bowl, both of which are rotatable on the same shaft. The rotor is the cathode of the electrolytic cell and has a circumferential surface. The bowl comprises an anode housing for the circumference of the rotor, and the housing defines an active anode surface which is annular and spaced from the circumferential surface of the cathode.

Crushed ore to be oxidized is pulped in an aqueous chloride containing electrolyte and applied to the active surface of the anode. The reactor is spun in the presence of sufficient chloride containing electrolyte to establish an electric circuit between the cathode and the anode, and so that a fluid pressure of from about 10 psi to about 100 psi is obtained at the active anode surface. A current density of from about 0.1 amp/sq.in. to about 1.0 amp/sq.in. is provided at the active anode surface so that chlorine is generated at the anode and the crushed ore particles at the active anode surface are oxidized to release metal values of interest.

A surprising result of the application of the invention to the release of gold from refractory ores is that under optimum conditions, the gold is not only released from the ore but is solubilized, presumably as a complex with chloride. This solubilization of the gold enables its recovery without the need to resort to cyanide leaching. Rather, the solubilized gold can be recovered by, for example, adsorption onto activated carbon.

Figure 1:
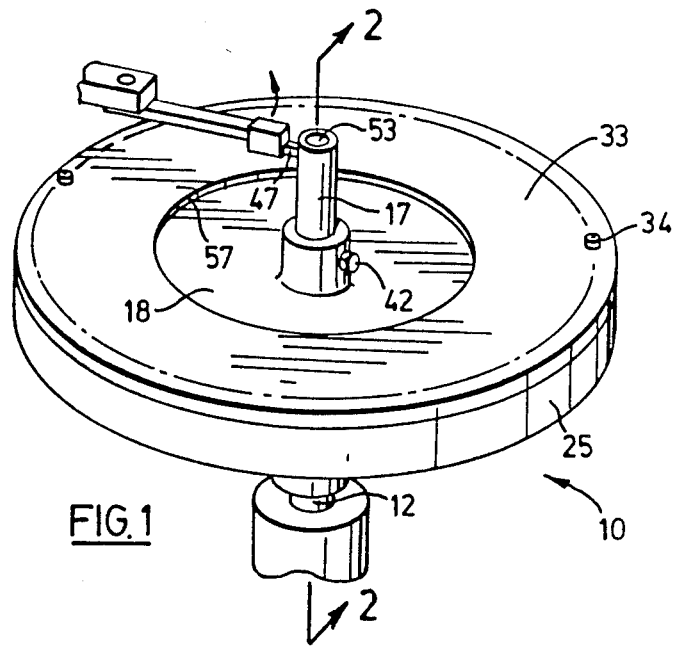
FIG. 1 is an overhead perspective view of a centrifugal reactor which can be used to conduct the process of the invention.

The process of the invention is best understood with reference to an apparatus for carrying it out. Such an apparatus is shown in the drawings, and is known as a centrifugal reactor 10. The reactor 10 comprises a rotatable shaft 12 defining a vertical axis 13. The shaft 12 may be driven to rotate about the axis 13 by drive means (not shown) which are well known, such as a motor driven belt.

Figure 2:
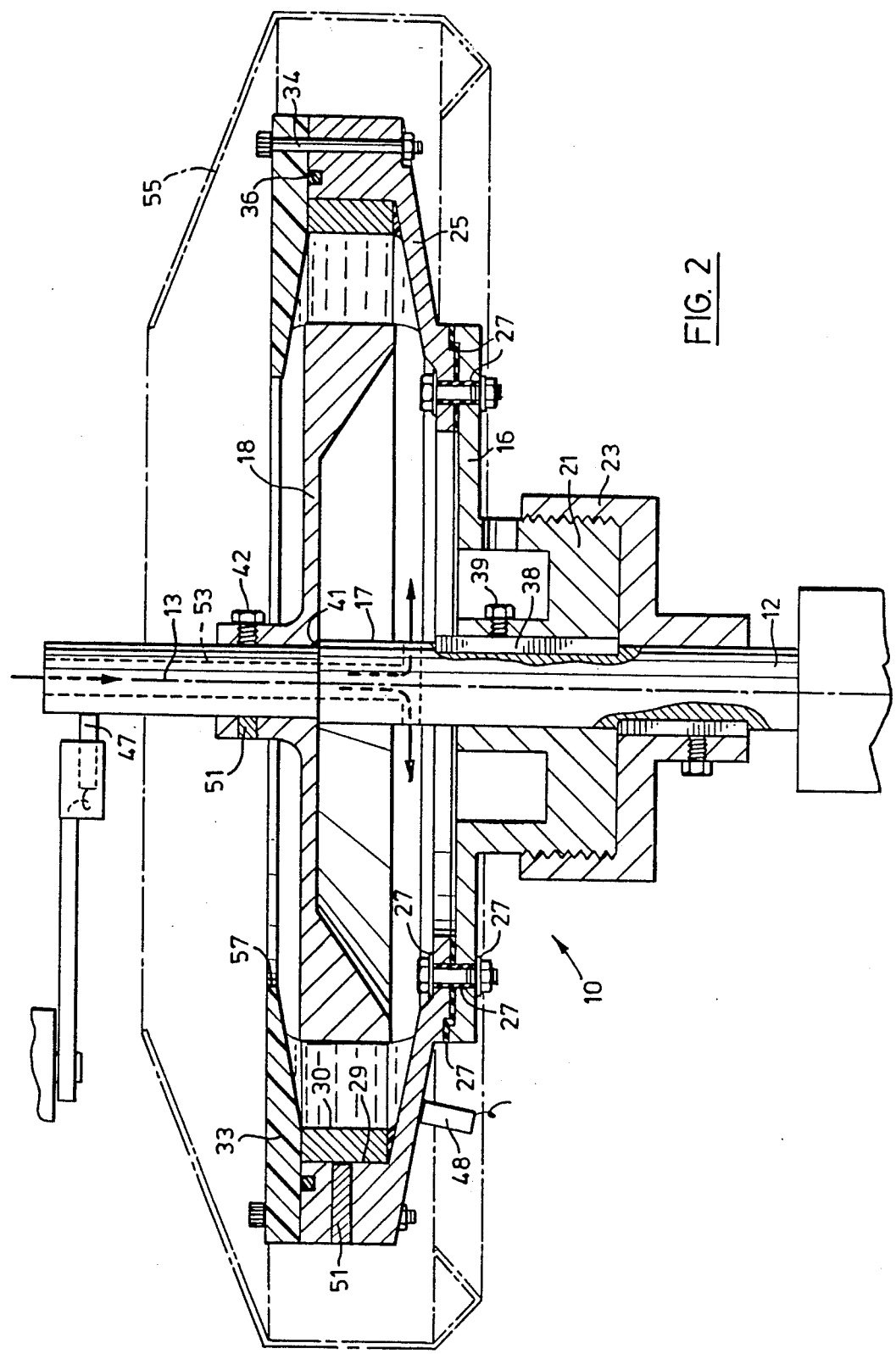
FIG. 2 is a cross sectional view taken through line 2—2 in FIG. 1.

Attached to the shaft 12 is a centrifuge bowl 16 having a central stem 17 upon which is attached a rotor 18. As shown in FIGS. 1 and 2, the components of the reactor 10 can be disassembled.

The bowl 16 of the reactor 10 has a base 21 which is attached to the shaft 12, in the apparatus illustrated, by means of a threaded coupling 23; and an anode housing 25 which is electrically insulated from the base 21. As shown in FIG. 2, the anode housing 25 is bolted to the base 21, and electrical insulation 27 is provided between the housing 25 and the base 21 as well as about the bolts joining the two portions.

The anode housing 25 has an upright annular surface 29 which is provided with an active anode surface 30 which may be, for example, graphite or sintered or fused magnetite. The anode housing 25 has a cover 33 which is attached to it by means of tie down bolts 34. A liquid seal for the cover 33 is provided by an 0-ring 36 between the cover 33 and the lower part of the housing 25.

The stem 17 is joined to the bowl 16 by, for example, a keyway and slot arrangement 38 and fixed by a set screw 39. The cathode rotor 18 is positioned on the stem 17 at a shoulder 41 and held in place by a set screw 42. The assembled reactor 10 operates with both the cathode rotor 18 and the anode housing 25 rotating synchronously with the rotation of the shaft 12.

The cathode rotor 18 has a circumferential upright surface 45 which is spaced from the opposing active anode surface 30. This upright surface 45 of the cathode 18 is the active surface thereof and may be made of graphite, mild steel or an electroplated mild steel to reduce over voltage.

The anode housing 25 may be made of titanium, and the cover 33 may be of titanium or plastic. When the anode housing 25 is made of titanium, an insulative oxide layer is quickly established when an aqueous electrolyte is used. This oxide layer ensures the flow of current between the cathode surface 45 and the active anode surface 30. The anode 25 and cathode 18 are charged by means of carbon brushes 47 and 48 which are connected to current regulating means (not shown). To ensure good electrical contact from the brushes 47 and 48 to the active surfaces of the anode 25 and cathode 18, graphite rods 51 are provided through the anode housing 25 in contact with the active surface 30, and through the neck of the rotor 18 in contact with the stem 17.

In operation, it is desirable to be able to add electrolyte to the reactor 10, and to collect electrolyte which may overflow the cover 33. Thus, the stem 17 is provided with a longitudinal bore 53 which opens beneath the rotor 18 to allow electrolyte to be added to the rotating reactor 10. To collect excess electrolyte which may overflow the cover 33, a catchment gutter 55 (shown in broken lines in FIG. 2) is provided about the reactor 10.

The centrifugal reactor 10, or a device similar thereto, is used to conduct the process of the invention in the following way. The cover 33 is removed from the remainder of the anode housing 25 and the rotor 18 is taken off the stem 17. The ore to be oxidized will have undergone several preliminary procedures such as crushing and concentrating, for example, by a flotation process. The granular ore concentrate is applied to the active anode surface 30, in this embodiment, by forming it into a thick paste with aqueous chloride containing electrolyte and plastering the paste onto the surface 30. Clearly, the ore to be treated can be applied to the surface in other ways, and for a commercial scale application the reactor 10 would not be disassembled for the application of the ore to the anode surface 30. Rather, the ore would be pulped with electrolyte and introduced into the spinning reactor 10, for example, through the bore 53 where it would quickly migrate to the surface 30 and be mechanically spread to an even thickness by means which are well known to those skilled in this art. In the presently described embodiment, however, the paste of ore applied to the surface 30 is formed into a continuous smooth ribbon of material using a metal form. This procedure has been adopted for laboratory scale applications in order to provide good control over the amount and thickness of the ore layer at the active surface 30.

The rotor 18 and cover 33 are replaced and the carbon brushes 47 and 48 are positioned in electrical contact with the cathode and anode portions of the reactor 10. The drive for the shaft 12 is turned on and the reactor 10 is rotated at the desired rate (measured in rpm). Electrolyte, which in this example is aqueous chloride solution, is added through the bore 53 to fill the space between the active anode surface 30 and the active cathode surface 45. Any excess electrolyte flows over the inner lip 57 of the cover 33 where it sprays off into the catchment gutter 55. The electrolysis is commenced by providing the desired current flow to the brushes 47 and 48.

The principal variables thought to affect the rate of oxidation of the ore are the fluid pressure at the active anode surface 30, the current density at the anode surface 30, the concentration of chloride in the electrolyte, and the temperature at which the reaction is conducted. The oxidation time is fairly short, i.e. generally considered to be less than about 30 min. for most ores, so that on a commercial scale, a large amount of ore can be processed within a reasonable time frame. Electrolyte can be added if desired to create a flow of electrolyte past the anode surface 30 or to replace electrolyte which may be lost during the process. However, it is felt that maintaining a flow of electrolyte through the reactor 10 during the process is not necessary and has the disadvantage of requiring a greater amount of liquid to be processed to recover metal values which may have dissolved therein during the electrolytic oxidation.

The oxidation itself is thought to result primarily from the oxidizing power of chlorine which is generated at the anode. However, some oxygen is also generated at the anode, and the actual oxidation mechanism may be fairly complex. Clearly, the electrochemical environment at the active anode surface 30 is highly oxidative, but it is thought that the oxidation power of the electrochemical cell falls off rapidly with distance from the surface 30. Therefore, it is important not to apply too thick a layer of ore to the active anode surface 30, so that oxidation of the ore will be accomplished uniformly to the desired extent.

Process conditions can be varied over a fairly wide range using the reactor 10 substantially as described. The fluid pressure at the active anode surface 30 may be as high as about 100 psi (pounds per square inch), but such pressures require fairly high rpm's and probably are not easily economically achieved. It is thought from studies on laboratory scale processes that fluid pressures in the range of 40-55 psi at the surface 30 are most preferred within the generally preferred commercial range of about 35-70 psi. The lower end of the range for practical application of the process is thought to be about 10 psi for the fluid pressure at the anode surface 30.

The current density at the active anode surface 30 may range in practice from a low of about 0.1 amp/sq.in. (amp per square inch) to about 1.0 amp/sq.in. For most applications, the current density would be about 0.5 amp/sq.in.

The operating temperature at the active anode surface 30 is controlled by controlling the temperature of the electrolyte. The practical range of temperatures is about 20° C. to about 100° C. Salt (NaCl) raises the boiling point of water so that the practical upper limit is about 104° C. for electrolyte being introduced into the reactor 10. Of course, the pressures developed within the reactor 10 during operation will allow for greater temperatures to be achieved, but in order to avoid a superheating of the liquid so that the system would have to be cooled down under pressure before the centrifugal process could be stopped, it is thought that about 100° C. is the practical upper limit for the process. Running the process at 80°-90° C. is preferred.

The preferred electrolyte is aqueous NaCl, but other salt solutions will work so long as sufficient chloride is present to effect the oxidation. Electrolyte having from between about 3 g/l (grams per liter) to 300 g/l NaCl have been used, and while it is thought that the optimum salt concentration will vary with the ore being oxidized, a brine having about 250 g/l NaCl is generally a suitable electrolyte for the process.

Upon completion of the oxidation, the current is turned off and the drive for the shaft 12 is disengaged allowing the reactor 10 to come to a halt. The electrolyte settles in the bowl 16 of the reactor 10, and the oxidized ore remains at the active anode surface 30. Recovery of oxidized ore and electrolyte from the reactor 10 as shown and as described herein requires disassembly of the reactor 10 and removal of the bowl 16 from the shaft 12 by unscrewing it from the threaded coupling 23. In a commercial reactor of this type, electrolyte would be drained from the reactor and oxidized ore would be peeled from the active anode surface using known automated technology.

The oxidized ore and the recovered electrolyte are subjected to further conventional refining steps to recover metal values of interest. With regard to the oxidation of refractory gold ores, it has been found that the process of the invention not only releases entrained gold but also causes at least some of the gold to be solubilized. Optimization of conditions is expected to enable the present process to solubilize substantially all of the gold in at least some refractory ores so that recovery of the gold can be accomplished without the need to conduct a cyanide leach of the oxidized ore.

Additional features of the present invention may be appreciated by the skilled person upon consideration of the following examples which were conducted using substantially the apparatus as shown and described herein.

TEST PROCEDURE AND RESULTS

I. Arsenical gold mineralization: Giant Yellowknife flotation concentrate

A total of twenty tests were made in accordance with the method of invention. All tests were carried out over relatively short periods of one to ten minutes duration in an electrolyte varying in strength from 50 g to 300 g NaCl per liter at a temperature of about 100° C. After treatment in the reactor 10, the solids were given repeated hot water washes to remove soluble clorides followed by leaching in hydrochloric acid to remove the products of oxidation generated from the associated arsenic and iron sulphides. The purpose of acid leaching was to permit assaying to show the degree to which these minerals had been oxidized and would not be a part of commercial practice unless of course there was the objective of recovering a saleable arsenic by-product. Results of the above noted series of tests are set out partially in Table I, and are summarized as follows:

Gold: 2.5% to 23.8% of the gold content of a concentrate assaying 1.58 oz. gold/ton solubilized as chloride.

Silver: 0 to 54.2% of the silver content of the same concentrate assaying 0.48% oz. silver/ton solubilized as chloride (silver tetrachloride complex).

Arsenic: 0 to 10.7% of the arsenic content of the same concentrate assaying 7.98% arsenic/ton oxidized and subsequently taken into solution by a subsidiary process.

Iron: 1.4% to 40.3% of the iron content of the same concentrate assaying 17.18% iron/ton solubilized as chloride.

II. Oxidized silver mineralization, Nevada, U.S.A.

Nineteen tests were made on mill-run rock from a presently suspended Nevada operation, the samples assayed approximately 14 oz. silver/ton. The material is refractory and does not respond to conventional cyanidation; it carries oxidized and sulphide silver mineralization in a manganiferous-limonitic matrix. Baryte and calcite are also present.

Cyanidation of the otherwise unprocessed material yielded a silver recovery averaging 46.3% after 36 hrs. of agitated leaching in 1% KCN solution. Electro-oxidation in the centrifugal reactor improved cyanidation recovery to between 60.7% to 62.5%. In all cases a very weak NaCl electrolyte was used and this at normal room temperature, namely 2.9 g and 5.8 g NaCl per liter; or 2% to 6% of the strengths used in processing the arsenical gold concentrate. A tabulation of some of the more pertinent tests is shown in Table II.

Practically all tests on the gold and silver ores were carried out at 2400 rpm, this speed generating a fluid pressure of about 11 psi at the active anode surface. Sample sizes were generally about 75 g.

Rate of flow of electrolyte is of major importance and should only be sufficient to make up for electrolytic consumption and mechanical loss. Testing of the described arsenical ore was carried out with a rapid flow rate in the belief that solubilized gold and silver would be subject to reprecipitation in the reducing zone of the cathode if not removed quickly. This belief was mistaken as it is probable that the bulk of the solubilized gold and silver remains close to its source of origin within the pulp solids. The rapid flow of electrolyte on the other hand has a tendency to displace and sweep out the chlorinated electrolyte preventing the build up of the necessary layer of concentrated oxidizing fluid. This factor is believed to have had an adverse affect upon gold-silver recoveries and arsenic-iron oxidation of the tabulated examples.

TABLE I

| | | ELECTRO-OXIDATION OF AN ARSENICAL GOLD ORE | | | | | | | |
|---|---|---|---|---|---|---|---|---|---|
| Test Description | Sample No. | Bondar-Clegg Assay Data | | | | Percent Solubilized | | | |
| | | Au | Ag | As | Fe | Au | Ag | As | Fe |
| Head Sample | | 1.595 | 0.50 | 7.96 | 17.18 | — | — | — | — |
| Acid Leach of Unprocessed Con. | 1 | 1.570 | 0.46 | 9.34 | 14.00 | — | — | — | 30.2% |
| 6 Min. Electrolysis NaCl soln. @ 50 g/l | 2 | 1.815 | 0.60 | 8.87 | 18.44 | 2.4% | 0 | 5.5% | 8.8% |
| 6 Min. Electrolysis NaCl soln. @ 100 g/l | 3 | 1.663 | 0.46 | 8.83 | 17.92 | 11.0% | 18.8% | 6.4% | 11.8% |
| 6 Min. Electrolysis NaCl soln. @ 150 g/l | 4 | 1.605 | 0.40 | 9.06 | 20.00 | 14.0% | 29.2% | 3.9% | 1.4% |
| 6 Min. Electrolysis NaCl soln. @ 200 g/l | 5 | 1.665 | 0.58 | 8.89 | 19.00 | 10.6% | 0 | 5.5% | 6.2% |
| 6 Min. Electrolysis NaCl soln. @ 250 g/l | 6 | 1.660 | 0.42 | 9.15 | 18.25 | 10.6% | 25.0% | 2.4% | 9.6% |
| 6 Min. Electrolysis NaCl soln. @ 300 g/l | 7 | 1.620 | 0.42 | 9.42 | 19.28 | 12.7% | 25.0% | 0 | 4.4% |
| Electrolyte 250 g/l: Duration 1 min. | 8 | 1.660 | 0.58 | 9.15 | 11.68 | 7.7% | 0 | 0 | 40.3% |
| Electrolyte 250 g/l: Duration 2 mins. | 9 | 1.725 | 0.52 | 9.00 | 18.88 | 6.1% | 6.3% | 3.0% | 5.5% |
| Electrolyte 250 g/l: Duration 4 mins. | 10 | 1.418 | 0.78 | 9.16 | 14.64 | 23.8% | 0 | 2.5% | 27.7% |
| Electrolyte 250 g/l: Duration 6 mins. | 11 | 1.660 | 0.42 | 9.15 | 18.25 | 10.6% | 25.0% | 2.4% | 9.6% |
| Electrolyte 250 g/l: Duration 8 mins. | 12 | 1.610 | 0.56 | 8.40 | 16.64 | 13.6% | 2.1% | 10.7% | 17.9% |
| Electrolyte | 13 | 1.580 | 0.26 | 8.88 | 14.28 | 16.1% | 54.2% | 6.6% | 30.3% |

TABLE I-continued

ELECTRO-OXIDATION OF AN ARSENICAL GOLD ORE

| Test Description | Sample No. | Bondar-Clegg Assay Data | | | | Percent Solubilized | | | |
| --- | --- | --- | --- | --- | --- | --- | --- | --- | --- |
| | | Au | Ag | As | Fe | Au | Ag | As | Fe |
| 250 g/l: Duration 10 mins. | | | | | | | | | |

TABLE II

ELECTRO-OXIDATION OF AN OXIDIZED SILVER ORE, NEVADA, U.S.A.

| Test Description | Duration | Head | Tail | % Recovery |
| --- | --- | --- | --- | --- |
| 1st Head Sample | — | 14.19 oz | — | — |
| Conventional Cyanidation | 36 hours | 14.19 oz | 7.48 oz | 47.3 |
| Conventional Cyanidation | 36 hours | 14.19 oz | 7.78 oz | 45.2 |
| Electrolysis plus Cyanidation: NaCl soln. 2.92 g/l | 19 mins | 14.19 oz | 5.32 oz | 62.5 |
| Electrolysis plus Cyanidation: NaCl soln. 2.92 g/l | 22 mins | 14.19 oz | 5.56 oz | 60.8 |
| Electrolysis plus Cyanidation: NaCl soln. 2.92 g/l | 13 mins | 14.19 oz | 5.58 oz | 60.7 |
| 2nd Head Sample | — | 13.80 oz | — | — |
| 2nd Head Sample NaCl 2.92 g/l | 30 mins | 13.80 oz | 5.38 oz | 61.0 |
| 2nd Head Sample NaCl 2.92 g/l | 30 mins | 13.80 oz | 5.32 oz | 61.4 |

I claim:

1. A process for oxidizing a sulfidic ore to recover metal values of interest, comprising:
   applying a pulp of crushed ore and aqueous chloride containing electrolyte to an active surface of the anode of a centrifugal electrolytic reactor, the reactor having a central rotor cathode, the circumference of which is enclosed by an anode housing defining the active anode surface spaced about the circumference of the rotor;
   spinning the reactor in the presence of sufficient chloride containing electrolyte to establish an electric circuit between the cathode and the anode, and so that a centrifugal fluid pressure of from about 10 psi to about 100 psi is obtained at the active anode surface; and
   providing a current density at the active anode surface of from about 0.1 amp/sq.inch to about 1.0 amp/sq.inch so that chlorine is generated at the anode and the crushed ore particles at the active anode surface are oxidized to release metal values of interest.

2. A process as claimed in claim 1, wherein the temperature of the electrolyte is in the range of from about 20° C. to about 100° C.

3. A process as claimed in claim 1, wherein the electrolyte comprises an aqueous solution of NaCl having a concentration of from about 3 g/l to about 300 g/l NaCl.

4. A process as claimed in claim 1, wherein oxidation of the ore at the active anode surface is continued for from about 3 min. to about 30 min.

5. A process as claimed in claim 1, wherein electrolyte is added during the oxidation of the ore.

6. A process as claimed in claim 1, wherein the fluid pressure is from about 35 psi to about 70 psi.

7. A process as claimed in claim 1, wherein the fluid pressure is from about 40 psi to about 55 psi.

8. A process as claimed in claim 1, wherein the current density is about 0.45 amp/sq.in. to about 0.55 amp/sq.in.

9. A process as claimed in claim 2, wherein the temperature of the electrolyte is in the range of from about 70° C. to about 95° C.

10. A process as claimed in claim 2, wherein the temperature of the electrolyte is in the range of from about 80° C. to about 90° C.

11. A process as claimed in claim 3, wherein the NaCl concentration in the electrolyte is from about 50 g/l to about 300 g/l.

12. A process as claimed in claim 3, wherein the NaCl concentration in the electrolyte is about 250 g/l.

* * * * *